(12) United States Patent
Aoyagi et al.

(10) Patent No.: US 8,976,760 B2
(45) Date of Patent: Mar. 10, 2015

(54) COMMUNICATION CONTROL SYSTEM AND COMMUNICATION CONTROL METHOD

(75) Inventors: Kenichiro Aoyagi, Tokyo (JP); Hideaki Takahashi, Tokyo (JP); Minami Ishii, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 140 days.

(21) Appl. No.: 13/989,209

(22) PCT Filed: Nov. 17, 2011

(86) PCT No.: PCT/JP2011/076547
§ 371 (c)(1),
(2), (4) Date: May 23, 2013

(87) PCT Pub. No.: WO2012/070466
PCT Pub. Date: May 31, 2012

(65) Prior Publication Data
US 2013/0250916 A1 Sep. 26, 2013

(30) Foreign Application Priority Data
Nov. 26, 2010 (JP) ................................ 2010-264337

(51) Int. Cl.
*H04W 36/14* (2009.01)
*H04W 36/00* (2009.01)

(52) U.S. Cl.
CPC .......... *H04W 36/14* (2013.01); *H04W 36/0022* (2013.01)
USPC ............................ 370/331; 370/352; 455/436

(58) Field of Classification Search
CPC .......................... H04W 36/14; H04W 36/0022
USPC ................... 370/328, 329, 331, 352; 455/436
See application file for complete search history.

(56) References Cited

U.S. PATENT DOCUMENTS

| | | | |
|---|---|---|---|
| 2010/0165857 A1* | 7/2010 | Meylan et al. | 370/252 |
| 2010/0285812 A1* | 11/2010 | Murakami | 455/452.1 |
| 2010/0296421 A1* | 11/2010 | Watfa et al. | 370/310 |
| 2010/0296484 A1* | 11/2010 | Wu | 370/331 |
| 2010/0304748 A1* | 12/2010 | Henttonen et al. | 455/436 |
| 2010/0330995 A1* | 12/2010 | Aoyama et al. | 455/436 |
| 2011/0070906 A1* | 3/2011 | Chami et al. | 455/507 |
| 2011/0274083 A1* | 11/2011 | Bazzo et al. | 370/331 |

OTHER PUBLICATIONS

International Search Report issued in PCT/JP2011/076547 mailed Feb. 21, 2012 (2 pages).
Written Opinion issued in PCT/JP2011/076547 mailed Feb. 21, 2012 (3 pages).

(Continued)

*Primary Examiner* — Brian D Nguyen
(74) *Attorney, Agent, or Firm* — Osha Liang LLP

(57) ABSTRACT

To provide a communication control system and a communication control method, in which call connection delay can be reduced even in a case where a resource capable of continuing an established communication bearer in a radio communication system in a transition destination cannot be captured when a mobile station transitions to another radio communication system. An eNB 110 includes a handover control unit 115 configured to determine whether a handover of a PS bearer to a 3G system 20 is performed based on the priority of the PS bearer to the CS bearer when a connection destination of a mobile station 300 being in connection with an LTE system 10 using the PS bearer is switched to the 3G system 20.

2 Claims, 4 Drawing Sheets

(56) References Cited

OTHER PUBLICATIONS

Zte; "Redirection for CSFB"; 3GPP TSG SA WG2 Meeting #80, TD S2-103395; Brunstad, Norway; Aug. 30-Sep. 3, 2010 (2 pages).

3GPP TS 36.331 V8.11.0; "3rd Generation Partnership Project; Technical Specification Group Radio Access Network; Evolved Universal Terrestrial Radio Access (E-UTRA); Radio Resource Control (RRC); Protocol specification (Release 8)"; Sep. 2010 (212 pages).

* cited by examiner

| PRIORITY | BEARER TYPE |
|---|---|
| 1 | CS BEARER |
| 2 | PS BEARER |
| ⋮ | ⋮ |

COMMUNICATION CONTROL SYSTEM AND COMMUNICATION CONTROL METHOD

TECHNICAL FIELD

The present invention relates to a communication control system and a communication control method, in which a mobile station connectable to multiple radio communication systems is controlled.

BACKGROUND ART

For a mobile station connectable to multiple radio communication systems, such as a 3G (Wideband-CDMA) system (hereinafter, 3G) and a Long Term Evolution system (hereinafter, LTE), various methods (Inter-RAT mobility) of controlling the mobile station between radio communication systems have been specified.

For example, a mobile station (UE) being in connection with an LTE using a PS bearer, which is a packet switched-type communication bearer, can perform fallback (CSFB) to a 3G using a CS bearer, which is a circuit switched type communication bearer.

In this manner, the CSFB is a control method in which, when an LTE does not support a circuit switched (CS) call, the UE is transitioned to a radio communication system supporting the CS call, such as UTRAN (or GERAN of GSM (registered trademark)) in the 3G, so that the CS call is connected with the UE.

In a method of transitioning UE to a radio communication system supporting the CS call, procedures such as PS HANDOVER, Redirection with/without System Information Block, Redirection, and CELL CHANGE ORDER (see, Non-patent document 1) are specified. Specifically, an eNB (radio base station) determines which one of the above-described procedures is executed based on the capability of the UE.

Here, when the UE is in connection with the LTE using the PS bearer, i.e., when the UE is in connection with a PS call, it is a general practice that the PS HANDOVER procedure is preferentially executed for continuously utilizing the PS bearer also after the UE has transited to another radio communication system.

PRIOR ART DOCUMENT

Non-Patent Document

Non-patent document 1: 3GPP TS 36.331, Technical Specification Group Radio Access Network; Evolved Universal Terrestrial Radio Access (E-UTRA); Radio Resource Control (RRC); Protocol specification

SUMMARY OF THE INVENTION

However, for example, in the case of a communication bearer with a low priority, such as Default Bearer or in the case of a PS bearer for which recovery such as reconnection can be expected, a resource capturing procedure (success/failure) for the PS bearer may occur when the PS HANDOVER procedure is executed. For this reason, in the case of a call of a circuit switched-based service, such as a voice communication, which requires a real time response, connection delay of the call along with the transition of the UE to another radio communication system may occur.

FIG. 1 shows a conventional communication sequence in a case where a mobile station (UE) transitions from an LTE to a 3G. As shown in FIG. 1, an eNB executes a PS HANDOVER procedure, but if a RNC cannot capture a resource for a PS bearer, i.e., a resource which can continue an established communication bearer, the failure of the PS HANDOVER procedure is notified to the eNB (Steps S10 and S20). Then, the eNB executes Redirection procedure in place of the PS HANDOVER procedure (Steps S30 and S40). As a result of executing the Redirection procedure, the UE connects with a CS call via the 3G (W-CDMA). In this manner, the Redirection procedure is executed after the PS HANDOVER procedure, which causes a connection delay of the call.

For this reason, the present invention has been made in view of such situation. Accordingly, an object of the present invention is to provide a communication control system and a communication control method, in which call connection delay can be reduced even in a case where a resource capable of continuing an established communication bearer in a radio communication system in a transition destination cannot be captured when a mobile station transitions to another radio communication system.

A first feature of the present invention is a communication control system configured to establish a first communication bearer (e.g., a PS bearer) used for transmission of at least user data between a mobile station (mobile station 300) and a first radio communication system (LTE system 10) and configured to establish a second communication bearer (e.g., a CS bearer) used for transmission of at least user data between the mobile station and a second radio communication system different from the first radio communication system and is incapable of being established with the first radio communication system, including a handover control unit (handover control unit 115) configured to determine whether the handover of the first communication bearer to the second radio communication system is performed based on a priority of the first communication bearer to the second communication bearer when a connection destination of the mobile station being in connection with the first radio communication system using the first communication bearer is switched to the second radio communication system in order to establish the second communication bearer.

In the first feature of the present invention, the handover control unit may execute redirection processing to switch the mobile station to the second radio communication system without performing the handover of the first communication bearer to the second radio communication system when the priority of the second communication bearer is higher than the priority of the first communication bearer.

In the first feature of the present invention, the handover control unit may execute handover processing of performing the handover of the first communication bearer to the second radio communication system when the priority of the first communication bearer is equal to or higher than the priority of the second communication bearer.

In the first feature of the present invention, the handover control unit may execute redirection processing to switch the mobile station to the second radio communication system without performing the handover of the first communication bearer to the second radio communication system when the priority of the first communication bearer to the second communication bearer cannot be determined.

In the first feature of the present invention, the first communication bearer is of a packet switched type utilizing a packet switched technology and the second communication bearer is of a circuit switched-type utilizing a circuit switched technology, and the priority of the second communication bearer may be set higher than the priority of the first communication bearer.

A second feature of the present invention is a communication control method which establishes a first communication bearer used for transmission of at least user data between a mobile station and a first radio communication system and establishes a second communication bearer used for transmission of at least user data between the mobile station and a second radio communication system different from the first radio communication system and is incapable of being established with the first radio communication system, including the steps of: determining a priority showing which one of the first communication bearer and the second communication bearer is prioritized when a connection destination of the mobile station being in connection with the first radio communication system using the first communication bearer is switched to the second radio communication system; and determining whether the handover of the first communication bearer to the second radio communication system is performed.

MODES FOR CARRYING OUT THE INVENTION

Hereinafter, an embodiment of the present invention is described. Note that in the following description of the drawings, same or similar reference signs denote same or similar portions. In addition, it should be noted that the drawings are schematic and ratios of dimensions and the like are different from actual ones.

Therefore, specific dimensions and the like should be determined in consideration of the following description. Moreover, the drawings also include portions having different dimensional relationships and ratios from each other.

(1) Overall Schematic Configuration of Radio Communication System

Figure 2:
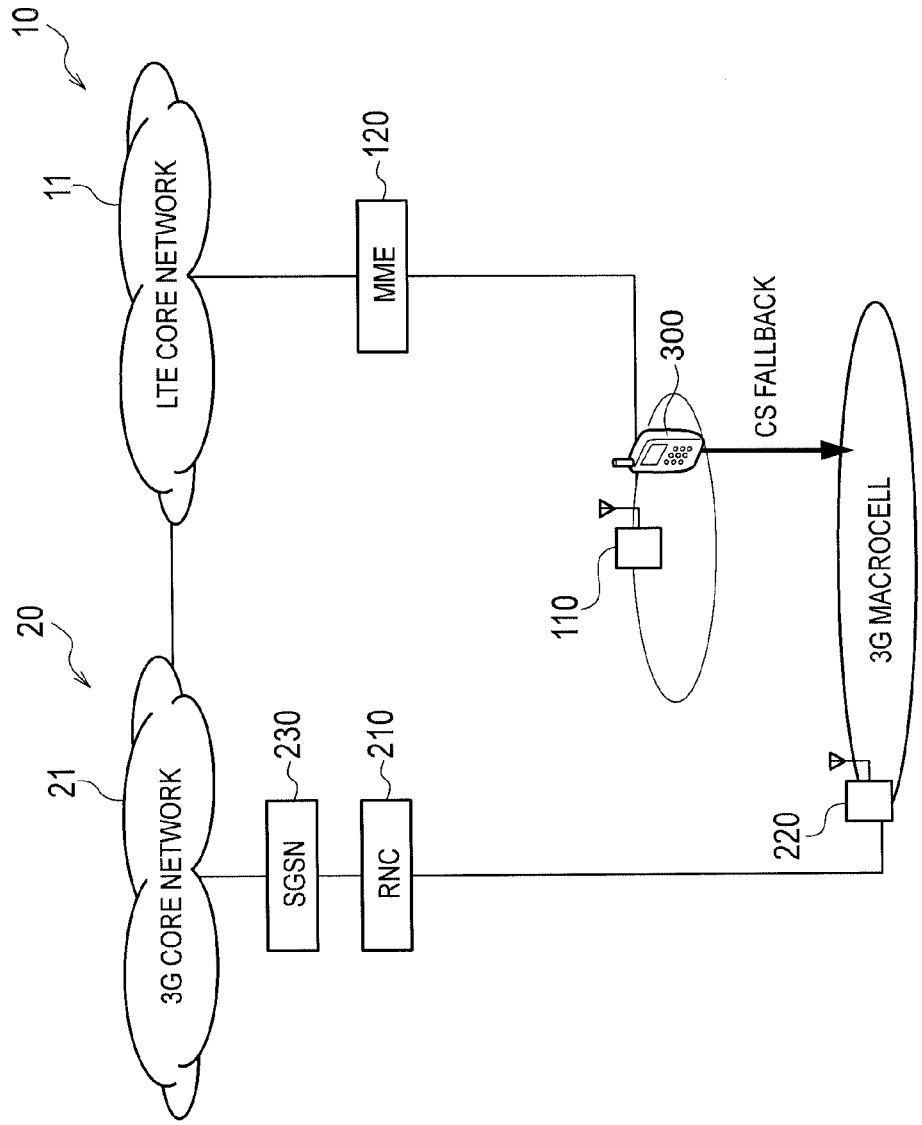
FIG. 2 is an overall schematic configuration diagram of a radio communication system according to an embodiment of the present invention.

FIG. 2 is an overall schematic configuration diagram of a radio communication system according to the present embodiment. As shown in FIG. 2, the radio communication system according to the embodiment includes an LTE system 10 and a 3G system 20.

The LTE system 10 (first radio communication system) is a radio communication system conforming to the LTE scheme. The 3G system 20 (second radio communication system) is a radio communication system conforming to the 3G scheme (W-CDMA). In other words, the LTE system 10 and the 3G system 20 use different radio access technologies (RATs).

The LTE system 10 includes an LTE core network 11, an eNB 110, and an MME 120. The 3G system 20 includes a 3G core network 21, a RNC 210, a BTS 220, and an SGSN 230 (Serving GPRS Support Node).

A mobile station 300 (UE) can be connected by radio with the LTE system 10 and the 3G system 20. Specifically, the mobile station 300 executes radio communications with the eNB 110 and is connected with the LTE system 10. Moreover, the mobile station 300 executes radio communications with the BTS 220 and is connected with the 3G system 20.

In the radio communication system according to the embodiment, a PS bearer (first communication bearer) is established between the mobile station 300 and the LTE system 10. In addition, a CS bearer (second communication bearer) is established between the mobile station 300 and the 3G system 20.

The PS bearer and the CS bearer are communication bearers and are physical or logical communication paths (paths) which are used for transmission of at least user data. Note that the communication bearer may be used for transmitting other data such as control data for communications, in addition to the user data.

The PS bearer is of a packet switched (PS) type which utilizes a packet switched technology. The CS bearer is of a circuit switched (CS) type which utilizes a circuit switched technology. In the embodiment, the LTE core network 11 is configured of only a PS domain, and thus the CS bearer can be established only in the 3G system 20 and is a communication bearer incapable of being established with the LTE system 10.

(2) Functional Block Configuration of Radio Communication System

Figure 3:
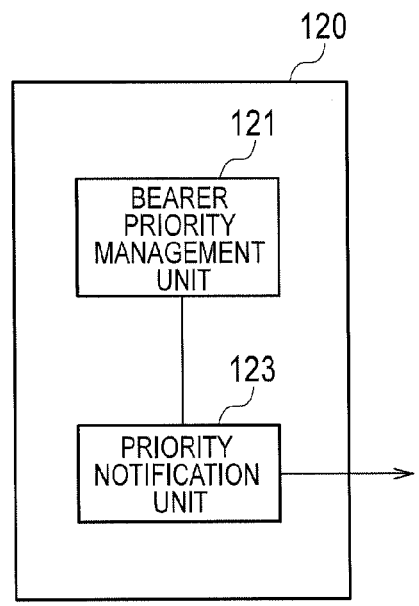
FIG. 3 is a functional block configuration diagram of an MME 120 according to the embodiment of the present invention.
Figure 4:
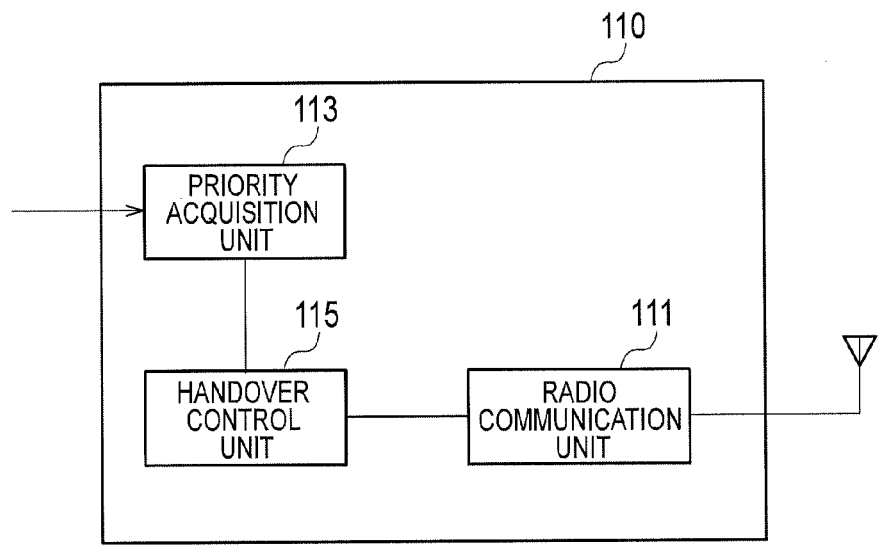
FIG. 4 is a functional block configuration diagram of an eNB 110 according to the embodiment of the present invention.

Hereinafter, the functional block configurations of major devices among the devices configuring a radio communication system are described. FIG. 3 is a functional block configuration diagram of the MME 120. Also, FIG. 4 is a functional block configuration diagram of the eNB 110. In the present embodiment, the eNB 110 and the MME 120 configure a communication control system.

(2.1) MME 120

As shown in FIG. 3, the MME 120 includes a bearer priority management unit 121 and a priority notification unit 123.

The bearer priority management unit 121 manages priorities of communication bearers established in the LTE system 10 and the 3G system 20. Specifically, the bearer priority management unit 121 stores a priority of the PS bearer to the CS bearer when a connection destination of the mobile station 300 being in connection with the LTE system 10 using the PS bearer is switched to the 3G system 20.

Figures 5, 6:
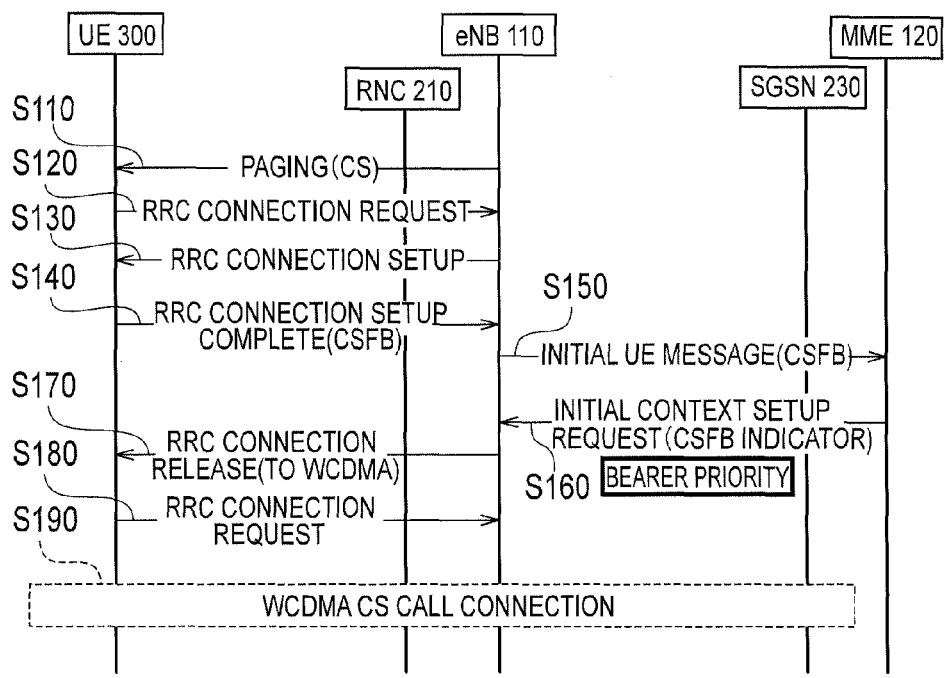
FIG. 5 is a drawing showing a communication sequence of a radio communication system according to the embodiment of the present invention.
FIG. 6 is a drawing showing an example of a bearer priority table 400 according to the embodiment of the present invention.

FIG. 6 shows an example of a bearer priority table 400 stored by the bearer priority management unit 121. As shown in FIG. 6, the bearer priority table 400 includes "priority" and "bearer type." A smaller value means a higher priority. In other words, in the present embodiment, the priority of the CS bearer is set higher than the priority of the PS bearer.

The priority notification unit 123 notifies a predetermined device of a priority of a communication bearer which is managed in the bearer priority management unit 121. Specifically, the priority notification unit 123 notifies the priority to the eNB 110 in the procedure in which the mobile station 300 transitions from the LTE system 10 to the 3G system 20.

For example, the priority notification unit 123 can contain the priority in an INITIAL CONTEXT SETUP REQUEST (CSFB indicator) which is notified to the eNB 110. Note that, the priority notification unit 123 may notify the priority to the eNB 110 by using a different message without containing the priority in the INITIAL CONTEXT SETUP REQUEST (CSFB indicator).

(2.2) eNB 110

As shown in FIG. 4, the eNB 110 includes a radio communication unit 111, a priority acquisition unit 113, and a handover control unit 115.

The radio communication unit 111 executes radio communications with the mobile station 300 conforming to the LTE scheme.

The priority acquisition unit 113 acquires a priority of a communication bearer which is notified from the MME 120. Specifically, the priority acquisition unit 113 acquires the priority contained in the INITIAL CONTEXT SETUP REQUEST (CSFB indicator).

The handover control unit 115 controls a handover of the communication bearer at the time of the transition of the mobile station 300 from the LTE system 10 to the 3G system 20, i.e., when the connection destination of the mobile station 300 is switched from the LTE system 10 to the 3G system 20.

Specifically, to establish the CS bearer, the handover control unit 115 determines whether the handover of the PS bearer to the 3G system 20 is performed based on the priority of the PS bearer to the CS bearer when the connection destination of the mobile station 300 being in connection with the LTE system 10 using the PS bearer is switched to the 3G system 20.

As a result of acquiring the priority by the priority acquisition unit 113, if the priority of the CS bearer is higher than the priority of the PS bearer, the handover control unit 115 can execute redirection processing to switch the mobile station 300 to the 3G system 20 without performing the handover of the PS bearer to the 3G system 20. Consequently, the handover of the PS bearer established with the LTE system 10 is not performed, but the mobile station 300 executes fallback to the 3G system 20 and newly establishes a CS bearer with the 3G system 20, and then connects with a CS call.

In addition, if it cannot be determined which one of the PS bearer and the CS bearer is prioritized, the handover control unit 115 can execute redirection processing to switch the mobile station 300 to the 3G system 20 without performing the handover of the PS bearer to the 3G system 20. Note that, the case where it cannot be determined which one of the PS bearer and the CS bearer is prioritized means a case where the priority acquisition unit 113 cannot acquire the priority from the MME 120 or where the priority of the corresponding communication bearer is not specified in the bearer priority table 400 (see, FIG. 6).

(3) Operation of Radio Communication System

Hereinafter, referring to FIG. 5, an operation of the above-described radio communication system is described. FIG. 5 shows a communication sequence of the radio communication system according to the present embodiment.

As shown in FIG. 5, the eNB 110 and the mobile station 300 start the fallback (CSFB) from the LTE system 10 to the 3G system 20 based on the occurrence of the CS call (e.g., a voice communication call) (Steps S110 to S140). Specifically, in a case where a CS call to the mobile station 300 occurs when the mobile station 300 is in connection with the eNB 110, i.e., when the mobile station 300 is present in the LTE system 10, the mobile station 300 and the eNB 110 start the fallback based on a paging signal from the eNB 110. Note that the processing at Steps S110 to S140 is similar to conventional one (see, FIG. 1).

Thereafter, the eNB 110 notifies an INITIAL UE MESSAGE (CSFB) to the MME 120 to request the fallback of the mobile station 300 to the 3G system 20 (Step S150).

The MME 120 notifies the eNB 110 of an INITIAL CONTEXT SETUP REQUEST (CSFB indicator) which is a response to the reception of the INITIAL UE MESSAGE (CSFB) (Step S160).

Here, the MME 120 causes an information element (bearer priority) showing the priority of the communication bearer to be contained in the INITIAL CONTEXT SETUP REQUEST (CSFB indicator) based on the bearer priority table 400 (see FIG. 6). It is assumed herein that it is notified that a CS bearer scheduled to be established in the 3G system 20 has a higher priority than a PS bearer which has been already established in the LTE system 10.

The eNB 110 and the mobile station 300 execute redirection processing to switch the connection destination of the mobile station 300 from the LTE system 10 to the 3G system 20 without performing the handover of the PS bearer being in connection based on the information element contained in the INITIAL CONTEXT SETUP REQUEST (CSFB indicator) received from the MME 120.

Specifically, the eNB 110 transmits a RRC CONNECTION RELEASE (to WCDMA) to the mobile station 300 (Step S170). Also, the mobile station 300 transmits a RRC CONNECTION REQUEST to the RNC 210 in the 3G system 20 based on the reception of the RRC CONNECTION RELEASE (to WCDMA) (Step S180). As a result, the mobile station 300 establishes a communication bearer (CS bearer) anew with the 3G system 20 and connects with the CS call occurred (Step S190).

In this manner, if the mobile station 300 is in connection with the LTE system 10 using the PS bearer, i.e., if the UE connects with the PS call, the redirection processing is immediately executed without executing the PS HANDOVER procedure (see FIG. 1) even when it is specified that the PS HANDOVER procedure is preferentially executed, in order to continuously utilize the PS bearer even after the transition of the mobile station 300 to the 3G system 20.

Note that, if the eNB 110 has acquired broadcast information of the 3G system 20, the broadcast information may be contained in a control signal in the redirection processing. Also, if the eNB 110 has acquired congestion information or control information of the 3G system 20, it may be adapted that the PS HANDOVER procedure or the redirection processing is not executed based on the information.

(4) Advantageous Effects

Figure 1:
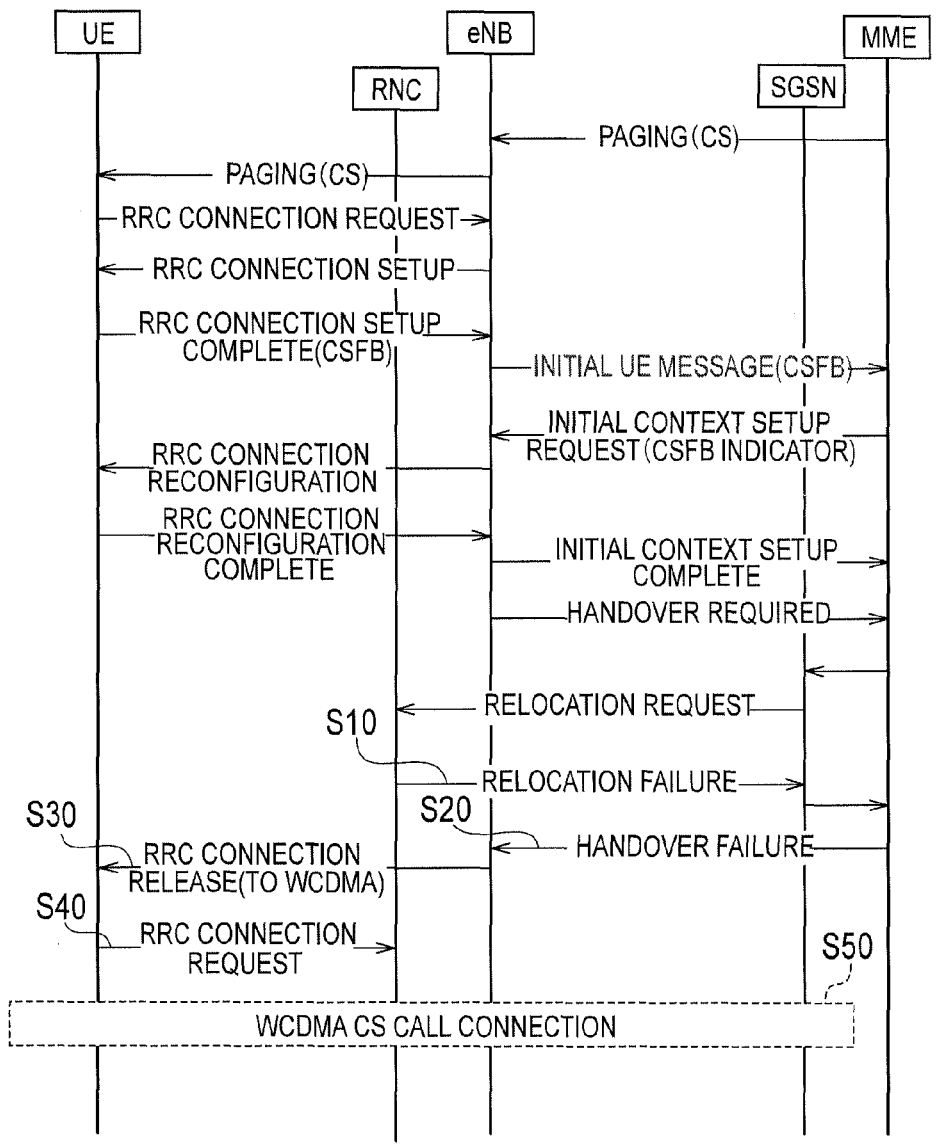
FIG. 1 is a drawing showing a communication sequence of a radio communication system according to a conventional example.

In the above-described radio communication system according to the present embodiment, if the handover of the PS bearer to the second radio communication system is performed or not is determined based on the priority showing which one of the PS bearer and the CS bearer is prioritized when the connection destination of the mobile station 300 is switched to the 3G system 20. As a result, the redirection processing is immediately executed without executing the PS HANDOVER procedure even when it is specified that the PS HANDOVER procedure is preferentially executed, in order to continuously utilize the PS bearer even after the transition of the mobile station 300 to the 3G system 20. Note that as shown in FIG. 1, in the conventional example, the eNB 110 determining whether the PS HANDOVER procedure is needed cannot determine the priority.

For this reason, call connection delay can be reduced even in a case where a resource for the PS bearer cannot be captured in the radio communication system in the transition destination of the mobile station 300.

(5) Other Embodiments

As described above, the present invention has been disclosed through the embodiment of the present invention, but it should not be understood that the description and drawings which constitute one part of this disclosure limit the invention. Various alternative embodiments will be apparent for those who are in the art from this disclosure.

For example, in the above-described embodiment, an example of CSFB is described. However, same processing can be executed in the Single Radio Voice Call Continuity (SR-VCC). For example, in a state where a Voice over IP (VoIP) bearer and a Default bearer are established between the mobile station 300 and the LTE system 10, a priority may be set so that the handover control unit 115 only performs handover of the VoIP bearer which is replaced by the CS bearer in the 3G system 20 by the SRVCC and does not perform handover of the Default bearer. In other words, the handover control unit 115 may execute the handover processing of the first communication bearer (VoIP bearer) to the 3G system 20.

In addition, if the priority of the communication bearer (first communication bearer) being established with the radio communication system with which the mobile station 300 is in connection is equal to or higher than the priority of the communication bearer (second communication bearer) being established with the radio communication system in the transition destination of the mobile station 300, the handover processing of performing handover of the first communication bearer to the radio communication system in the transition destination may be executed.

The above-described embodiment has been described by using the LTE system 10 and the 3G system 20 as an example. However, the scope of the invention is not limited to such radio communication systems and may be applied to a radio communication system (RAT) such as a GSM (registered trademark) or CDMA 2000.

In the above-described embodiment, the priority of the communication bearer is notified from the MME 120 to the eNB 110. However, in place of the priority, the communication bearer may be notified as an information element showing that the handover is not needed. Such an information element is also contained in the priority of the first communication bearer to the second communication bearer.

Also, the priority may be managed by a switching apparatus of the MME but the MME 120 or may be managed by a radio base station such as the eNB 110 or a gateway apparatus such as a HeNB-GW. Furthermore, the apparatus may also determine whether the handover of the communication bearer based on the priority is needed.

In this manner, the present invention naturally includes various embodiments which are not described herein.

Accordingly, the technical scope of the present invention is only defined by the invention specifying matters according to the scope of the invention which is apparent from the above description.

Note that the entire content of Japanese Patent Application Publication No. 2010-264337 (filed on Nov. 26, 2010) is incorporated herein by reference.

INDUSTRIAL APPLICABILITY

The characteristics of the present invention can provide a communication control system and a communication control method, in which call connection delay can be reduced even in a case where a resource capable of continuing a communication bearer which is being established in a radio communication system in a transition destination cannot be captured when a mobile station transitions to another radio communication system.

EXPLANATION OF THE REFERENCE NUMERALS

10 . . . LTE system
11 . . . LTE core network
20 . . . 3G system
21 . . . 3G core network
110 . . . eNB
111 . . . radio communication unit
113 . . . priority acquisition unit
115 . . . handover control unit
120 . . . MME
121 . . . bearer priority management unit
123 . . . priority notification unit
210 . . . RNC
220 . . . BTS
230 . . . SGSN
300 . . . mobile station

The invention claimed is:

1. A communication control system configured to establish a Voice over IP bearer between a mobile station and an LTE system and configured to establish a CS bearer between the mobile station and a 3G system, comprising:
   a handover control unit configured to perform handover of only the Voice over IP bearer which is replaced by the CS bearer in the 3G system by Single Radio Voice Call Continuity without performing handover of the another bearer not used for Voice over IP based on a priority of the Voice over IP bearer to another bearer not used for Voice over IP when a connection destination of the mobile station being in connection with the LTE system by establishing the Voice over IP bearer and the another bearer not used for Voice over IP is switched to the 3G system.

2. A communication control method which establishes a Voice over IP bearer between a mobile station and an LTE system and establishes a CS bearer between the mobile station and a 3G system, comprising the steps of:
   determining a priority of the Voice over IP bearer to another bearer not used for Voice over IP when a connection destination of the mobile station being in connection with the LTE system by establishing the Voice over IP bearer and the another bearer not used for Voice over IP is switched to the 3G system; and
   performing handover of only the Voice over IP bearer which is replaced by the CS bearer in the 3G system by Single Radio Voice Call Continuity without performing handover of the another bearer not used for Voice over IP.

* * * * *